(12) United States Patent
Bablumyan (10) Patent No.: US 11,947,314 B2
(45) Date of Patent: Apr. 2, 2024

(54) VOLUME HOLOGRAPHIC OPTICAL ELEMENTS WITH EXPANDED ANGULAR ACCEPTANCE

(71) Applicant: A9.com, Inc., Palo Alto, CA (US)

(72) Inventor: Arkady Bablumyan, Tucson, AZ (US)

(73) Assignee: A9.com, Inc., Palo Alto, CA (US)

( * ) Notice: Subject to any disclaimer, the term of this patent is extended or adjusted under 35 U.S.C. 154(b) by 471 days.

(21) Appl. No.: 17/122,160

(22) Filed: Dec. 15, 2020

(65) Prior Publication Data

US 2022/0187765 A1 Jun. 16, 2022

(51) Int. Cl.
| | | |
|---|---|---|
| *G03H 1/02* | (2006.01) | |
| *G02B 5/32* | (2006.01) | |
| *G03H 1/04* | (2006.01) | |

(52) U.S. Cl.
CPC ............. *G03H 1/0248* (2013.01); *G02B 5/32* (2013.01); *G03H 1/0408* (2013.01)

(58) Field of Classification Search
CPC .. G03H 1/0248; G03H 1/0408; G03H 1/0465; G03H 1/0486; G03H 1/28; G03H 1/265; G03H 1/0252; G03H 2001/0473; G03H 2001/2284; G03H 2001/261; G03H 2001/266; G03H 2001/0439; G03H 2001/2615; G03H 2001/262; G03H 2240/53; G02B 5/32; G02B 2027/0174
USPC .......................................................... 359/3
See application file for complete search history.

(56) References Cited

U.S. PATENT DOCUMENTS

| | | | |
|---|---|---|---|
| 6,906,836 B2 | 6/2005 | Parker et al. | |
| 8,233,204 B1 | 7/2012 | Robbins et al. | |
| 9,513,480 B2 | 12/2016 | Saarikko et al. | |
| 9,933,684 B2 * | 4/2018 | Brown ............... | G02B 27/4272 |

(Continued)

FOREIGN PATENT DOCUMENTS

| | | |
|---|---|---|
| WO | WO2016020643 A1 | 2/2016 |
| WO | WO2017180403 A1 | 10/2017 |
| WO | WO2018209108 A2 | 11/2018 |

OTHER PUBLICATIONS

Zengerle et al (Phase-Shifted Bragg Grating filters with improved transmission characteristics, J. Lightwave Tech, vol. 13, No. 12, Dec. 1995, pp. 2354-2358) (Year: 1995).*

(Continued)

*Primary Examiner* — Stephone B Allen
*Assistant Examiner* — Jyotsna V Dabbi
(74) *Attorney, Agent, or Firm* — Kilpatrick Townsend & Stockton LLP (57) ABSTRACT

VHOEs with expanded acceptance angle ranges are described as well as various systems and methods for fabricating VHOEs with expanded acceptance angle ranges. The VHOE with expanded acceptance angle range may include two or more individual Bragg gratings. The two or more individual Bragg gratings have the same diffraction geometry but with shifted Bragg conditions. Having the same diffraction geometry means when light is incident on the VHOE including two or more individual Bragg gratings, the diffracted light from each of the Bragg gratings is co-linear or overlapping with the diffracted light from the other Bragg gratings. The Bragg condition for each of the Bragg gratings are shifted with respect to each neighboring Bragg grating by an amount up to the acceptance angle range of each individual Bragg grating.

20 Claims, 5 Drawing Sheets

(56) References Cited

U.S. PATENT DOCUMENTS

| | | | |
|---|---|---|---|
| 2009/0245730 A1 | 10/2009 | Kleemann | |
| 2009/0303212 A1 | 12/2009 | Akutsu et al. | |
| 2012/0033306 A1 | 2/2012 | Valera et al. | |
| 2014/0168735 A1* | 6/2014 | Yuan | G03H 1/28 359/13 |
| 2015/0016777 A1 | 1/2015 | Abovitz et al. | |
| 2015/0293358 A1 | 10/2015 | de Matos Pereira Vieira et al. | |
| 2016/0116739 A1 | 4/2016 | TeKolste et al. | |
| 2016/0124229 A1 | 5/2016 | Yokoyama | |
| 2017/0276948 A1 | 9/2017 | Welch et al. | |
| 2019/0056593 A1* | 2/2019 | Bablumyan | G02B 27/44 |
| 2020/0225498 A1 | 7/2020 | Potnis et al. | |

OTHER PUBLICATIONS

Henry et al (Compound Bragg Reflection filters made by spatial frequency doubling lithography, J. Lighwave Tech, vol. 7, No. 9, Sep. 1989, pp. 1379-1385) (Year: 1989).*

Shen, Zhongwen, "Characterization and Optimization of Field of View in a Holographic Waveguide Display," IIEEE Photonics Journal, vol. 9, No. 6, Dec. 2017.

Piao, Jing-Ai, "Full Color Holographic Optical Element Fabrication for Waveguide-type Head Mounted Display Using Photopolymer," Journal of the Optical Society of Korea, vol. 17, No. 3, Jun. 2013, pp. 242-248.

Guo, Jingjing, "Design of a multiplexing grating for color holographic waveguide," SPIE, Optical Engineering 54(12) 125105, Dec. 2015.

Barden et al, "Volume-Phase Holographic Gratings and the Efficiency of Three Simple Volume-Phase Holographic Gratings," Publications of the Astronomical Society of the Pacific, 112:809-820, Jun. 2000.

Zhou et al., "See-through near-eye displays enabling vision correction," Optical Society of America, Jan. 25, 2017.

Bigler et al., "Holographic Waveguide HUD with in-line pupil expansion and 2D FOV expansion" Optical Society of America, 2019.

Close, D.H., Holographic Optical Elements, Optical Engineering, vol. 14, No. 5, Sep.-Oct. 9, 1975.

Augmented Reality Module (AR Module), Product Brief, WaveOptics, 2018.

Hunsperger, R.G., "Optical Waveguide Modes," Integrated Optics, DOI 10.1 007/b98730 2, Springer Science+Business Media, LLC 2009.

Wang et al., "Optical Design of Waveguide Holographic Binocular Display for Machine Vision," Applied Mechanics and Materials ISSN: 1662-7482, vols. 427-429, pp. 763-769, Sep. 27, 2013.

Guo et al., "Holographic waveguide display with a combined-grating in-coupler," Optical Society of America, Nov. 9, 2016.

* cited by examiner

VOLUME HOLOGRAPHIC OPTICAL ELEMENTS WITH EXPANDED ANGULAR ACCEPTANCE

BACKGROUND OF THE INVENTION

Field of the Invention

The present invention relates to volume holographic optical elements (VHOEs) with expanded angular acceptance. More particularly, the present invention relates to VHOEs with multiple Bragg gratings with the same diffraction geometry but with shifted Bragg conditions.

Background Art

Image projection through a waveguide via total internal reflection (TIR) is an elegant way to build augmented reality (AR) devices like heads-up displays (HUD), automotive windshield displays, near eye displays (NED) such as those on glasses, and more. Such devices generally require (1) an element to couple an image into the waveguide, (2) an element to expand a pupil so as to provide reasonable observation area for the viewer, and (3) an element to couple the image out of the waveguide toward the viewer. There are multiple techniques to build such elements. One common technique is based on the use of surface relief gratings (SRG) because of their virtually unlimited angular and wavelength acceptance. However, in some cases use of SRG elements in AR devices is unacceptable because of the following drawbacks:
1. Almost 50% of the light may be outcoupled toward the world-side instead of toward the viewer.
2. SRGs may have limited diffraction efficiency (DE) because in Raman Nath type of diffraction, which SRG is based on, the light energy is diverted into multiple diffraction orders.
3. A rainbow effect may be observable by the viewer due to diffraction of world-side light sources into the observation area.
4. SRGs may cause color separation for large field of view (FOV) because only one grating is typically used for the whole visible spectral range of the image.

An alternative to SRGs that is free of above drawbacks is the use of volume holographic optical elements (VHOE) that are based on Bragg diffraction, which has only one diffraction order. An AR device based on a waveguide using VHOEs that operate via Bragg diffraction resolves the first three issues completely. The fourth issue may also be resolved by use of VHOEs because each of red, green, and blue (RGB) colors may be treated independently, for example, by multiplexing separate RGB elements in a single holographic recording film or on separate holographic recording films laminated on the top of each other. With this approach, cross-talk between RGB elements is generally negligible due to the high wavelength selectivity of Bragg diffraction.

Limitations of VHOEs

Figure 1:
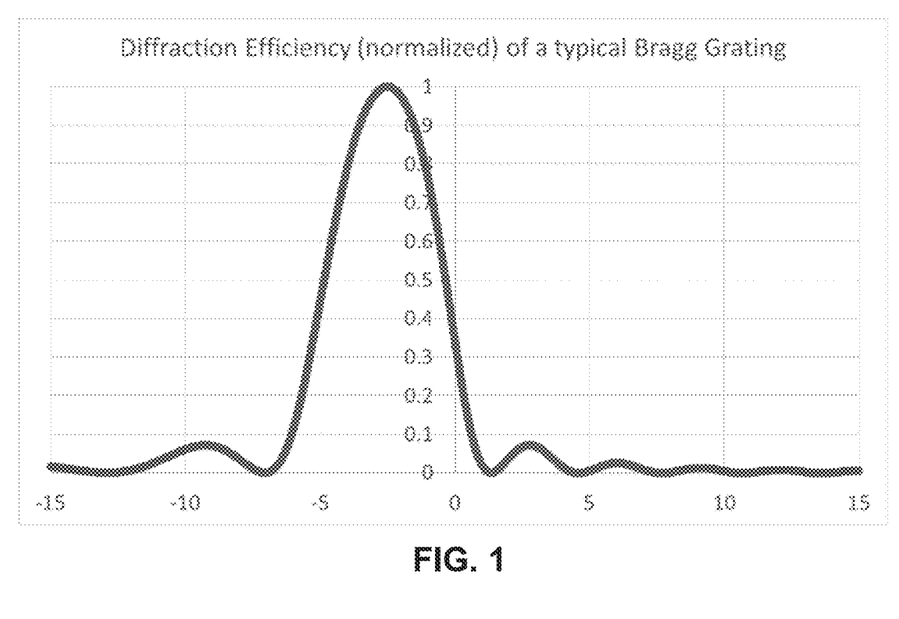
FIG. 1 shows a graph illustrating the diffraction efficiency of a typical VHOE.

The main limitation with using VHOEs for an AR device is that Bragg diffraction is very selective with regard to input angle. The diffraction efficiency decreases rapidly away from the Bragg angle. Such a limitation on the VHOE acceptance angle generally limits the field of view of the resulting AR device. For example, using commercially available photopolymer films, the normalized diffraction efficiency of a typical Bragg grating as a function of angular detune from Bragg angle is shown in FIG. 1. In this specific example the acceptance angle (measured at the first zeros of the DE plot) is approximately 8 degrees.

One method to expand the FOV of a VHOE AR device is to multiplex several VHOEs with different and offset acceptance angle ranges. However, if the multiple VHOEs reside in a single waveguide, without special design and fabrication considerations, cross talk between the multiple VHOEs generally creates ghost images, potentially rendering the resulting AR device unacceptable. The multiple VHOEs may be placed in different waveguides that are optically isolated with a small air gap or low index material between them. Such angular range multiplexing has been disclosed in previous applications. A drawback of this angular range multiplexing method is the increase in the device thickness. For most AR applications, a thinner and lighter device is highly desired.

BRIEF SUMMARY OF THE INVENTION

It is an objective of the present invention to provide systems, devices and methods, that allow for expansion of the angular range of a VHOE, as specified in the independent claims. Embodiments of the invention are given in the dependent claims. Embodiments of the present invention can be freely combined with each other if they are not mutually exclusive.

Figure 2A:
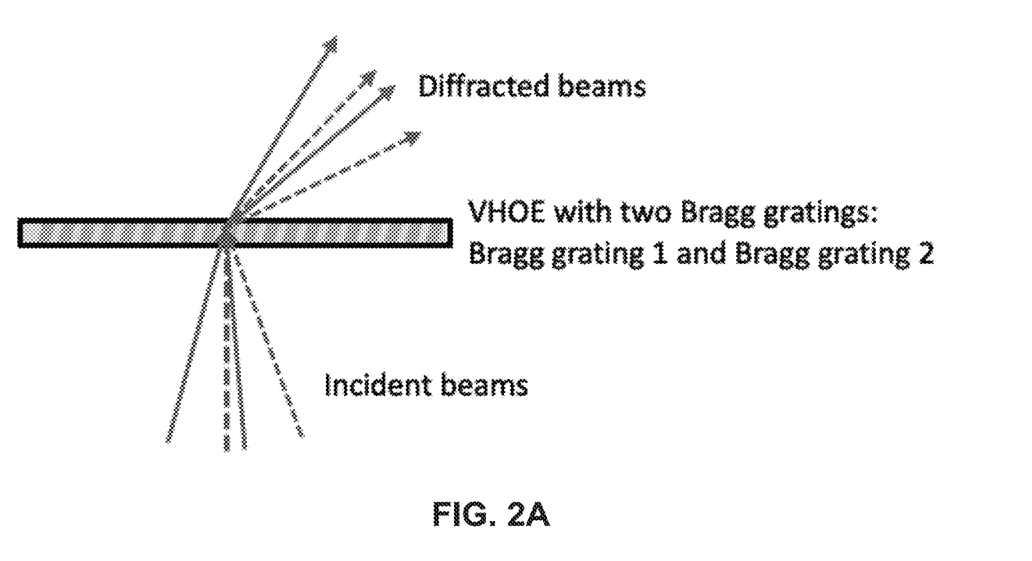
FIG. 2A shows an illustration of a VHOE with two Bragg gratings that have shifted Bragg conditions but the same diffraction geometry. The acceptance angle range for Bragg grating 1 is shown in solid line and the acceptance angle range for Bragg grating 2 is shown in dashed line. The two acceptance angle ranges are shifted relative to each other with a small overlap, so as to enlarge the acceptance angle range of the combined VHOE.
Figure 2B:
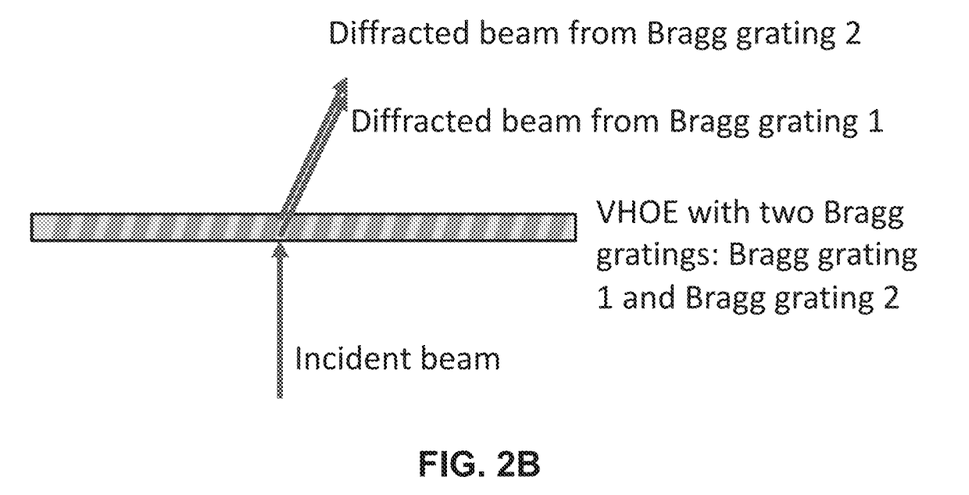
FIG. 2B shows an illustration of a VHOE with two Bragg gratings that have shifted Bragg conditions but the same diffraction geometry. Diffracted beams of an incident beam that satisfies the Bragg condition from each Bragg grating exit the VHOE and propagate in the same direction. The diffraction efficiency of the two beams may not be identical.
Figure 3:
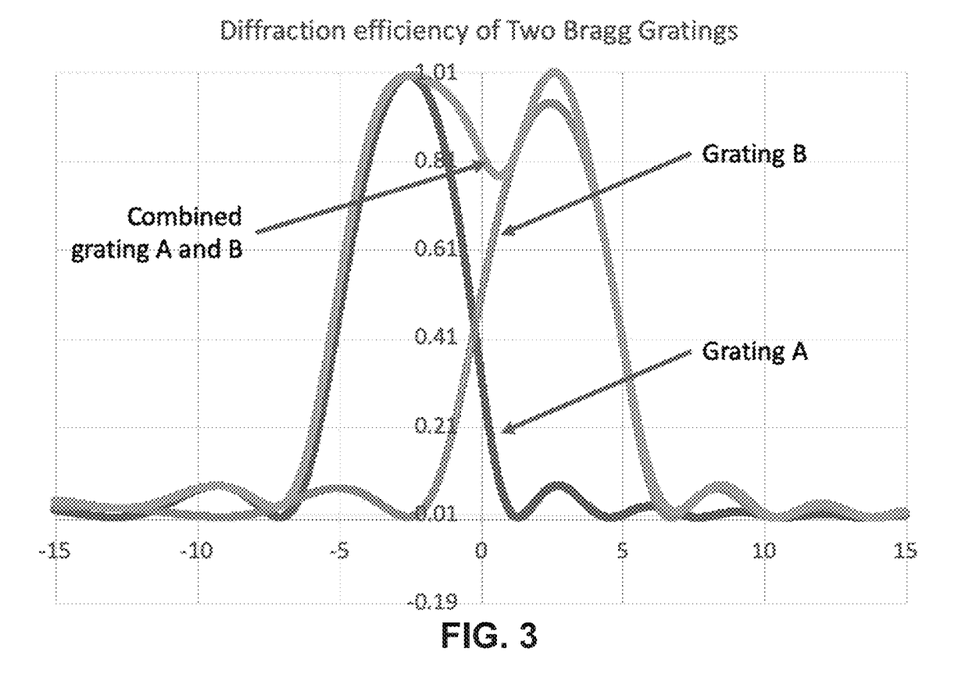
FIG. 3 shows a graph illustrating the diffraction efficiency of a VHOE of the present invention, the VHOE consisting of two Bragg gratings with their Bragg conditions shifted with respect to one another.

The present invention features VHOEs with expanded acceptance angle ranges as well as various methods of fabricating VHOEs with expanded acceptance angle ranges. The VHOE with expanded acceptance angle range may consist of two or more individual Bragg gratings. The two or more individual Bragg grating may reside on one or more layers of holographic recording films such as photopolymer films. In preferred embodiments, the two or more individual Bragg gratings have the same diffraction geometry but with shifted Bragg conditions. FIG. 2A illustrates the concept of a VHOE with two Bragg gratings having an expanded acceptance angle range due to the combination of the acceptance angle ranges of the two Bragg gratings. The gratings have their Bragg conditions shifted with respect to each other such that there is a small overlap in the acceptance angle ranges. An important condition for such VHOE's is that the two Bragg gratings must have the same diffraction geometry. This means when light is incident on the VHOE including two or more individual Bragg gratings, the diffracted light from each of the Bragg has the same diffraction angle. This is shown in FIG. 2B, in which one beam is incident on both Bragg gratings at an angle that satisfies the Bragg condition for both Bragg grating 1, and Bragg grating 2. Each Bragg grating produces a diffracted beam, and the two diffracted beams from the two Bragg gratings have the same diffraction angle and therefore exit the gratings and propagate co-linearly. This is important, because if the two Bragg gratings do not have the same diffraction geometry, and the two diffracted beams in FIG. 2B do not exit the gratings and propagate co-linearly, then for a waveguide combiner application, there will be a shifted and scrambled double image. The Bragg condition for each of the Bragg gratings are shifted with respect to each neighboring Bragg grating by an amount up to the acceptance angle range of each individual Bragg grating. Acceptance angle range may be defined as the range between the angles where diffraction efficiency drops to zero (e.g. the range of angles with non-zero diffraction efficiency). If the two neighboring Bragg grating have different acceptance angle range then the Bragg condition shift between them can be up to half of the sum of two acceptance angle ranges. For example, a VHOE may consist of two individual Bragg gratings, Bragg grating A and Bragg grating B. The Diffraction Efficiency (DE) for Bragg grating A is shown in FIG. 3. The acceptance angle for Bragg grating A measured at first zeros is about $\Delta\theta_A=8$ degrees, and the Bragg condition is centered on −2.5 degrees. The DE for Bragg grating B is also shown in FIG. 3. The acceptance angle for Bragg grating B measured at first zeros is also about $\Delta\theta_B=8$ degrees and the Bragg condition is shifted with respect to the Bragg grating A by about 5 degrees and centered at +2.5 degrees. The DE for the combined grating, also shown in FIG. 3, indicates an acceptance angle measured at first zeros of about 14 degrees.

One of the unique and inventive technical features of the present invention is the inclusion of multiple Bragg gratings with the same diffraction geometry, and precisely shifted Bragg conditions in a single VHOE. Without wishing to limit the invention to any theory or mechanism, it is believed that the technical feature of the present invention advantageously provides for a VHOE with an expanded acceptance angle range. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The features and advantages of the present invention will become apparent from a consideration of the following detailed description presented in connection with the accompanying drawings in which.

DETAILED DESCRIPTION OF THE INVENTION

In one embodiment, the present invention features a VHOE with expanded angular range, the VHOE having multiple Bragg gratings with substantially identical diffraction geometry, but with shifted Bragg conditions. Without wishing to limit the present invention to any particular theory or mechanism, it is believed that having substantially identical diffraction geometry allows light rays meeting each of the Bragg conditions to have their diffracted light rays exit the Bragg gratings as co-linear and overlapping rays as they propagate. If the diffraction geometry of the two Bragg gratings are not substantially identical, then the two diffracted light rays mat deviate from each other as they propagate after exiting the Bragg gratings.

In other embodiments, the present invention features methods for fabricating multiple-Bragg-grating VHOEs with expanded angular range. In preferred embodiments, the multiple Bragg gratings of each VHOE have sub-wavelength precision alignment.

In some embodiments, the VHOE with expanded angular range may include a first Bragg grating and a second Bragg grating. The first Bragg grating may have a first diffraction geometry and a first Bragg condition, and the second Bragg grating may have a second diffraction geometry and a second Bragg condition. According to a preferred embodiment, the first diffraction geometry may be substantially identical to the second diffraction geometry and the second Bragg condition is shifted with respect to the first Bragg condition. As a non-limiting example, the second Bragg condition may be shifted with respect to the first Bragg condition by an offset angle. In preferred embodiments, the offset angle is less than an acceptance angle range of each of the Bragg gratings, such that there is no gap between the acceptance angle ranges of the two Bragg gratings and the diffraction efficiency of the combined Bragg gratings does not drop to zero within the combined acceptance angle range. In another embodiment the offset angle is chosen such that between the Bragg conditions of the two gratings, the diffraction efficiency of the combined Bragg gratings does not drop below about 10, 20, 30, 40, or 50% of the maximum diffraction efficiency of the combined gratings. In preferred embodiments, the offset angle may be chosen such that there is no visually noticeable decrease in image intensity in the angular range between the angles at which the combined gratings provide maximum diffraction efficiency.

In some embodiments, both Bragg gratings are in a single film. In alternative embodiments, each of the Bragg gratings is in a different film. In some embodiments, the VHOE is a reflection VHOE. In other embodiments the VHOE is a transmission VHOE. As non-limiting examples, the VHOE may be used as an incoupler, an outcoupler, a y-expander, or an x-expander. Because the Bragg conditions of the Bragg gratings are shifted with respect to each other, each of the Bragg gratings may correspond to a different angular range. As a non-limiting example, the first and second Bragg gratings may correspond to first and second overlapping angular ranges or fields of view. In further embodiments, the VHOE may include three or more such Bragg gratings. As a non-limiting example, the VHOE may additionally include a third Bragg grating having a third diffraction geometry and a third Bragg condition, where the third diffraction geometry is substantially identical to the first and second diffraction geometries, and the third Bragg condition is shifted with respect to the second Bragg condition by an offset angle. As still another non-limiting example, the VHOE may additionally include a fourth Bragg grating having a fourth diffraction geometry and a fourth Bragg condition, where the fourth diffraction geometry is substantially identical to the first, second, and third diffraction geometries, and the fourth Bragg condition is shifted with respect to the third Bragg condition by an offset angle.

In some embodiments, the present invention may feature a waveguide image combiner for combining light from real imagery with light from a light engine. As a non-limiting example, the waveguide image combiner may include an optically transparent substrate having top and bottom surfaces, and a pair of incoupling and outcoupling VHOEs, spaced apart and overlaid on the top surface of the optically transparent substrate. In preferred embodiments, the optically transparent substrate conveys light from the overlaid incoupling VHOE to the overlaid outcoupling VHOE via total internal reflection (TIR). In further preferred embodiments, each of the VHOEs includes multiple Bragg gratings with substantially identical diffraction geometries and with Bragg conditions shifted with respect to each other.

In some embodiments, each of the VHOEs of the waveguide image combiner include multiple Bragg gratings for each of a plurality of color ranges. Each of the color ranges may be a narrow range of wavelengths (e.g. nearly a single wavelength for laser sources) or a wider range of wavelengths (e.g. for LED sources). As a non-limiting example, the VHOE may include 2 Bragg gratings for a red color range, 2 for a blue color range, and 2 for a green color range. As another non-limiting example, the VHOE may include 3 Bragg gratings for a red color range, 3 for a blue color range, and 3 for a green color range. As still another non-limiting example, the VHOE may include 4 Bragg gratings for a red color range, 4 for a blue color range, and 4 for a green color range. In some embodiments, the Bragg gratings for each color range have substantially identical diffraction geometries and have Bragg conditions shifted with respect to each other. In some embodiments, each of the VHOEs has only a single film such as a photopolymer film. In alternative embodiments, each of the VHOEs includes multiple stacked films. Each film may include a single Bragg grating or multiple Bragg gratings. As one non-limiting example, each of the films may include a Bragg grating for each of the plurality of color ranges (with the same, or different angular ranges for each of the Bragg gratings). As another non-limiting example, each of the films may have multiple Bragg grating for one of the plurality of color ranges or for multiple color ranges.

In another embodiment, the present invention features a method of fabricating a volume holographic optical element (VHOE) with expanded angular range. As a non-limiting example, the method may include: providing one or more holographic recording films; identifying a first recording beam geometry for two first laser beams (e.g. an object beam and a reference beam); recording a first Bragg grating in one of the holographic recording films using the two first laser beams and the first recording beam geometry, the first Bragg grating having a first diffraction geometry and a first Bragg condition; diffracting a laser beam through the first Bragg grating and monitoring a diffraction; identifying a second recording beam geometry for two second laser beams, based on the monitored diffraction from the first Bragg grating; and recording a second Bragg grating in one of the holographic recording films using the two second laser beams and the second recording beam geometry, the second Bragg grating having a second diffraction geometry and a second Bragg condition; where the first diffraction geometry is substantially identical to the second diffraction geometry, and the second Bragg condition is shifted with respect to the first Bragg condition by an offset angle.

In some embodiments, the second recording beam geometry may be identified by: shifting the diffracted laser beam to a position where an intensity of the diffracted beam falls, but is still observable; and shifting another laser beam to be co-linear with the diffracted laser beam and monitoring the interference pattern of the two laser beams while adjusting the other laser beam until the two beams are aligned such that less than one fringe is visible. In other embodiments, the method additionally includes laminating one of the holographic recording films onto a recording station and placing a total internal reflection (TIR) coupling prism on top of the holographic recording film such that they are optically coupled together using an index-matching liquid. In some embodiments the two first laser beams may be repositioned so as to be the two second laser beams. The first and second Bragg gratings may be in the same holographic recording film or in different holographic recording films. In selected embodiments, the method may include recording additional Bragg gratings to further expand the angular range of the VHOE. In some embodiments, the method may additionally include laminating one of the holographic recording films onto a recording station and placing a total internal reflection (TIR) coupling prism on top of the holographic recording film such that they are optically coupled together using an index-matching liquid.

As another non-limiting example of a method of fabricating a VHOE with extended acceptance angular range, the method may include: providing a holographic recording film, a first laser, and a second laser; recording a first Bragg grating in the film using two laser beams from the first laser, the laser beams having a first recording beam geometry; and simultaneously recording a second Bragg grating in the film using two laser beams from the second laser, the laser beams having a second recording beam geometry. In an alternative embodiment, the first and second Bragg gratings may be recorded consecutively instead of simultaneously. In preferred embodiments, the first Bragg grating and the second Bragg grating have substantially identical diffraction geometry, and a Bragg condition of the first Bragg grating is shifted by an offset angle with respect to a Bragg condition of the second grating.

In some embodiments, the method may also involve predetermining the geometry of the second recording beam. As a non-limiting example, the second recording beam geometry may be determined by: providing an alignment film; recording an alignment Bragg grating in the alignment film using two laser beams from first laser, the laser beams having the first recording beam geometry; photo bleaching the alignment Bragg grating; illuminating the alignment Bragg grating with a first laser beam from the second laser, monitoring a diffracted beam while rotating the first laser beam from the second laser by a Bragg shift; and aligning a second laser beam from the second laser to be co-linear with the diffracted beam by monitoring their interference pattern and adjusting the second laser beam from the second laser to null out the interference fringe pattern. The Bragg shift may be determined by the decrease in intensity of the diffracted beam. As a non-limiting example, the Bragg shift may be determined by shifting the first laser beam from the second laser to a position where an intensity of the diffracted beam falls, but is still observable. The method may additionally involve using one or more fringe lockers to stabilize an optical path of one or more of the laser beams along one or more axes.

As another non-limiting example, a method of fabricating a VHOE with extended acceptance angular range may include: providing a first holographic recording film; recording a first Bragg grating in the first film using two laser beams having a first recording beam geometry; repositioning the two laser beams to a second recording beam geometry; providing a second holographic recording film; and recording a second Bragg grating in the second film using the two laser beams having the second recording beam geometry. In preferred embodiments, the first Bragg grating and the second Bragg grating have substantially identical diffraction geometry, and a Bragg condition of the first Bragg grating is shifted by an offset angle with respect to a Bragg condition of the second grating.

As a non-limiting example, the second recording beam geometry may be identified by: photo bleaching the first Bragg grating; illuminating the first Bragg grating with the two laser beams; monitoring the diffracted beam while rotating a first of the two laser beams by a Bragg shift; and aligning a second of the two laser beams to be co-linear with the diffracted beam by monitor their interference pattern, and adjusting the second laser beam to null out the interference fringe pattern. The Bragg shift is determined by the decrease in intensity of the diffracted beam. In some embodiments, the method may additionally involve using one or more fringe lockers to stabilize an optical path of one or more of the laser beams. In some embodiments, the method may additionally include recording additional Bragg gratings on additional films to further expand the angular range of the VHOE.

In another embodiment, the present invention features a system for recording VHOEs with expanded angular range. As a non-limiting example, the system may include: a recording block, a total internal reflection (TIR) prism, a plurality of recording lasers, a plurality of dichroic beam splitters, a beam splitter to split the laser light into two recording beams, a plurality of beam expansion and collimation optics, and a plurality of fixed and adjustable mirrors for directing the recording beams to the TIR prism and the recording block from specific angles. In some embodiments, the system may have multiple pairs of recording beams, each with its own set of corresponding optics. As a non-limiting example, the system may have a pair of recording beams for each of a plurality of angular ranges for which the system is configured to record Bragg gratings. In another embodiment, the system may have a single pair of recording beams, or multiple pairs of recording beams, but less than the number of angular ranges for which the system is configured to record Bragg gratings. In some embodiments, the system may additionally include a camera or other light detector for guiding alignment of the recording angles such that the Bragg gratings have precisely offset Bragg conditions.

As a non-limiting example, a system for recording VHOEs with expanded angular range may include a recording block; a TIR prism; one or more laser sources; a plurality of optical elements configured to split laser light from the one or more laser sources into first, second, third, and fourth recording beams; a plurality of optical elements configured to direct the first recording beam to the TIR prism at a first recording angle; a plurality of optical elements configured to direct the second recording beam to the recording block at a second recording angle; a plurality of optical elements configured to direct the third recording beam to the TIR prism at a third recording angle; and a plurality of optical elements configured to direct the fourth recording beam to the recording block at a fourth recording angle; where the recording block and the TIR prism are configured to be positioned on either side of a film, the first and second recording beams are configured to record a first Bragg grating in the film and the third and fourth recording beams are configured to record a second Bragg grating in the film, and where the recording angles are such that the first Bragg grating and the second Bragg gratings have identical diffraction geometry but offset Bragg conditions. In some embodiments, the third recording beam may be formed by redirecting the first recording beam and the fourth recording beam may be formed by redirecting the second recording beam.

The recording systems of the present invention may include one or more fringe lockers. Fringe locking is a well-known optical technique to stabilize the optical path and maintain the phase relationship of the recording beams used to print VHOEs (and holograms in general). The optical path may be changed by temperature changes, wind currents, heating of the optical elements or a number of other environmental factors. The change in optical path, decreases the modulation of the interference and "washes out" the fringe pattern. Fringe locking may be used to stabilize single or multiple axes or angle in the recording system and requires one fringe locking subsystem per degree of freedom to be stabilized. Fringe lockers work by incorporating control beam as a separate laser beam that travels along the same path as the recording bream or diverting a small fraction of the recording beam and interfering the control beam and the recording beam at a detector near the recording locating. The interference of the control signal creates fringes at the detector and a separate mechanical or electrical transducer in the systems adjusts the position of a mirror or other phase delay device to keep the fringe positioned in the same location on the detector. The change in the position of the mirror also effects the path length one of the recording beams maintaining the phase relationship between the two beams to compensate for the changes in the system. In some embodiments, after the laser positions of the multiple angular ranges are fixed, fringe tracking may be engaged to ensure that the optical path remains constant over the exposure or across multiple exposures.

EXAMPLES

The following are non-limiting examples of the present invention. It is to be understood that said examples are not intended to limit the present invention in any way. Equivalents or substitutes are within the scope of the present invention.

Methods:

The VHOEs of the present invention (with expanded acceptance angle ranges from multiple Bragg gratings) may be fabricated in a single photopolymer film, or in multiple photopolymer films laminated on top of each other. In either case, it may be important to make sure the multiple Bragg gratings have identical diffraction geometry. The next two examples describe two methods to set up the recording conditions to produce multiple-Bragg-grating-VHOEs with expanded acceptance angle range.

Example 1: Multi-Exposure of Single Layer of Photopolymer Film

Figure 4:
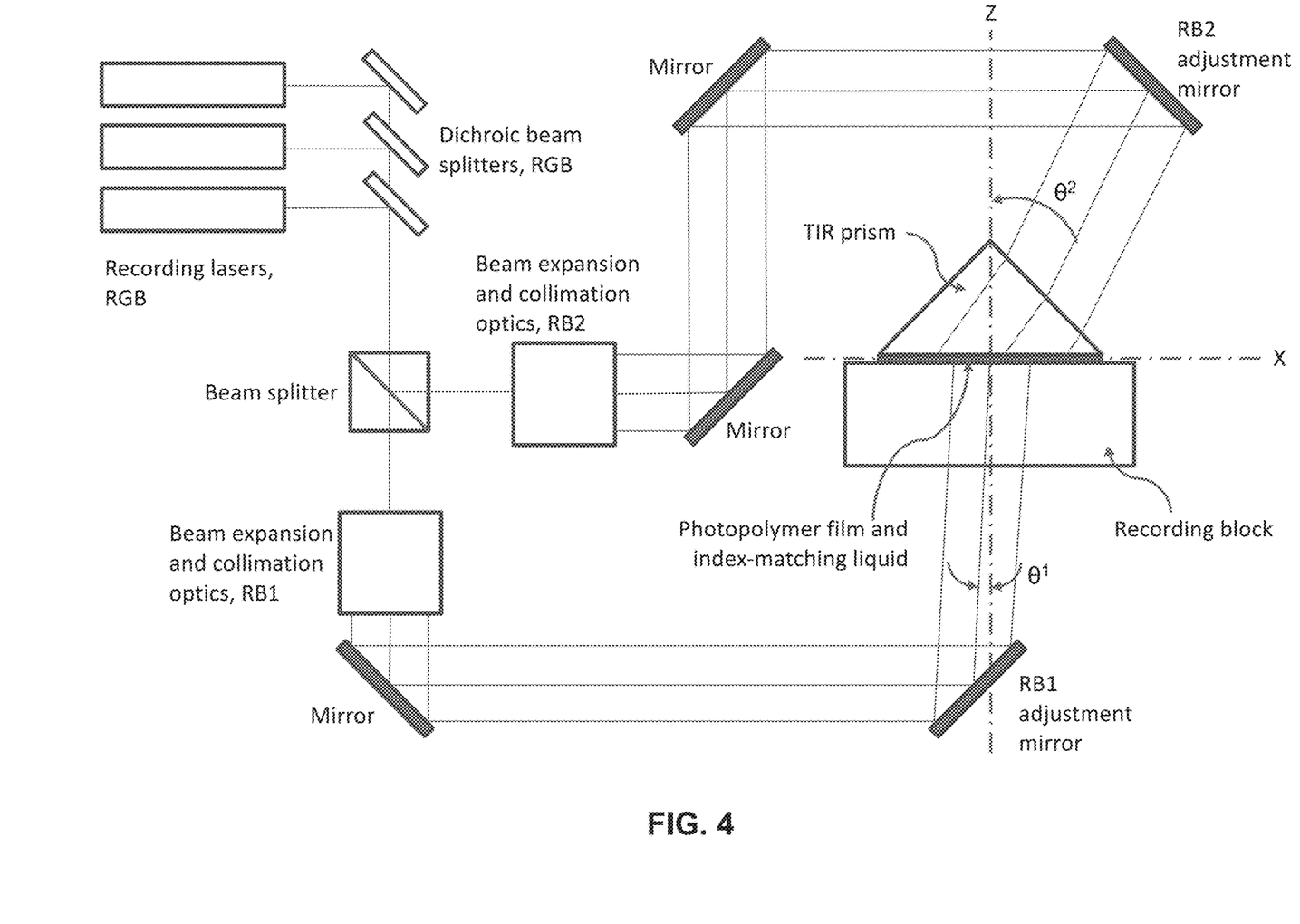
FIG. 4 shows a schematic illustration of a conventional VHOE recording station.
Figure 5:
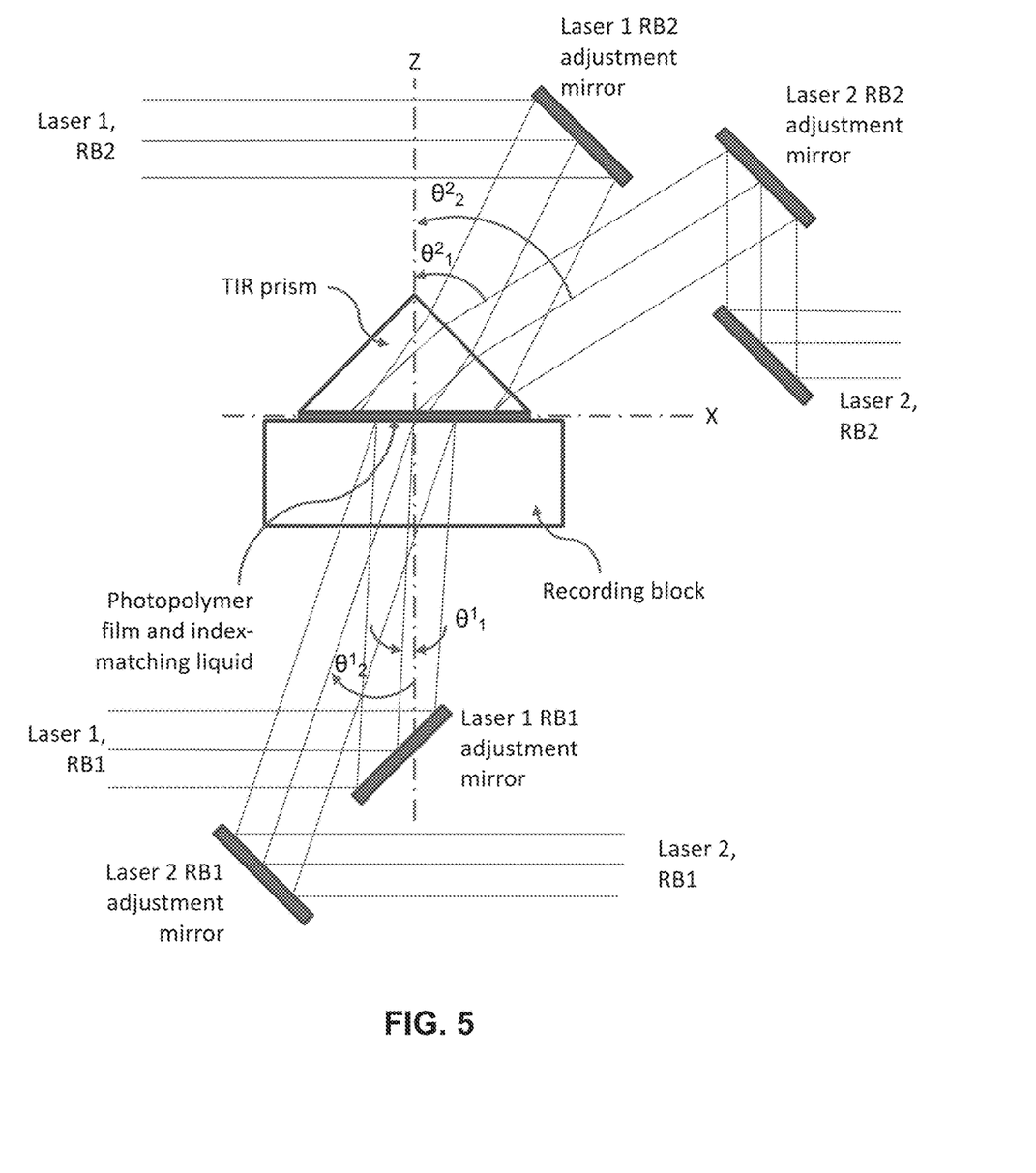
FIG. 5 shows a schematic illustration of a VHOE recording station for simultaneously recording two Bragg gratings with shifted Bragg conditions.
Figure 6:
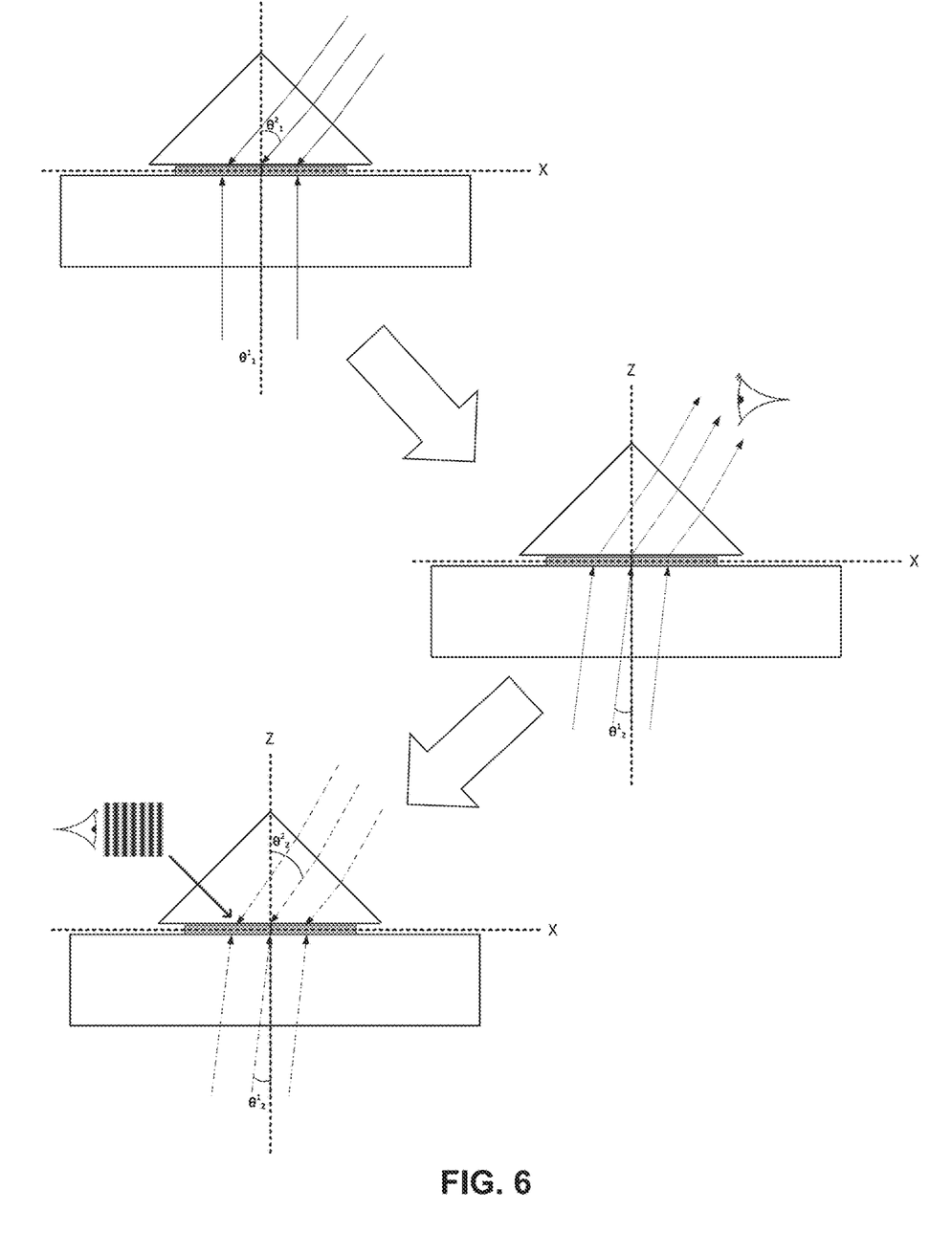
FIG. 6 shows an illustration of a method for forming a VHOE that consists of two Bragg gratings via sequential exposure.

In this example, multiple Bragg gratings are recorded in a single photopolymer film using a recording setup with multiple pairs of recording laser beams. This example describes the setup and alignment process of the recording station for recording a VHOE with two Bragg gratings for extended acceptance angle ranges. The recording setup for this example is shown in FIG. 4. The basic structure and major components of this recording setup has similarities with a typical VHOE recording station. One key difference is the addition of a second laser (Laser #2). Both lasers may then be used to record the second Bragg grating. If a third Bragg grating is desired, then a third laser (Laser #3), may be needed. Generally, using this approach, an additional laser is needed for every additional Bragg grating. The recording block provides an optically transparent, dimensionally flat, and mechanically stable platform for the photopolymer film. The coupling prism is preferably of high quality by general optical standards. The recording lasers need to be sufficient quality (typically single mode with coherent length greater than a few meters) and have sufficient power to record the VHOEs at a reasonable amount of exposure time.

The method includes the following steps:

Step 1. Laminate a photopolymer film onto the recording station and place a TIR coupling prism on top of the photopolymer film such that they are optically coupled together using an index-matching liquid.

Step 2. Setup the recording geometry for the alignment Brag grating, which may be same grating as the first Bragg grating with two recording beams from Laser #1. The two beams are generated from the same laser using a beam splitter. Both beams are collimated. Setup one of the recording beams (beam 1) incident to the photopolymer film through the recording block (for this particular example at an angle of $\theta^1_1=2$ degree with respect to the surface normal of the recording block). Setup the second recording beam (beam 2) incident to the photopolymer film through the coupling prism (for this particular example at an angle of $\theta^2_1=68.5$ degrees with respect to the surface normal of the recording block face). The specific recording beam geometry of $(\theta^1_1, \theta^2_1)$ are determined based on the desired performance of the grating.

Step 3. Photo bleach the photopolymer film with the alignment Bragg grating.

Step 4. Identify the recording beam geometry and align the recording beams for the second Bragg grating by:
 a. While the alignment Bragg grating is still fixed on the recording station, turning on one of the recording beams (RB1) from Laser #2 and illuminating the alignment Bragg grating at angle of $\theta_1$ and monitoring the diffracted beam. This monitoring can be done by visual inspection directly or with a camera.
 b. Shifting the RB1 from Laser #2 to the shifted position of $(\theta^1_2)$ where the diffracted beam intensity falls but still observable either visually or with a camera. This should be near the edge of the acceptance angle range where the diffraction efficiency drops to zero. For this particular example, the shift may be around 9 degrees and $\theta^1_2=11$ degrees with respect to the surface normal of the recording block.
 c. Setting the second recording beam (RB2) from Laser #2 such that the interference pattern generated by RB1 and RB2 from Laser #2 located at the photopolymer plane collapse to less than one fringe. At this point, RB2 is positioned at $(\theta^2_2)$ and the two recording beams from Laser #2 are aligned for record the second Bragg grating. For this particular example, the $\theta^2_2=52.5$ degrees with respect to the surface normal of the recording block.

Step 5. Now the recording geometry for both Bragg gratings is established. The photopolymer film used for the alignment grating should be removed. The recording beams from both lasers should be locked in place. The recording station is now ready to record VHOEs with two Bragg gratings.

Note: Steps 1-5 are for the setup of the recording geometry. Once the setup is complete, steps 6-10 may be used to record an VHOE with two Bragg gratings.

Step 6. Laminate a photopolymer film onto the recording station and place a TIR coupling prism on top of the photopolymer film such that they are optically coupled together using an index-matching liquid.

Step 7. Record the first Bragg grating using RB1 and RB2 from Laser #1.

Step 8. Record the second Bragg grating using RB1 and RB2 from Laser #2. The second Bragg grating may optionally be recorded simultaneously as the first Bragg grating.

Step 9. Photo bleach the photopolymer film with both gratings recorded.

Step 10. The VHOE with two Bragg grating is ready, delaminate from the recording block.

This example is for setting up a recording station for VHOEs with two Bragg gratings for expended acceptance angle range of two overlapping angular ranges. This same technique may also be used to fabricate VHOEs with additional Bragg gratings for expanded acceptance angle ranges of three, four, or more angular ranges. In the end, physical space limitations may limit number of recording beam pairs that can fit on a single recording station. Additionally, this multiplexing of recording multiple Bragg gratings on a single layer of photopolymer film may reduce the diffraction efficiency because of the limited dynamic range of the photopolymer film.

Example 2: Sequential Exposure of Multiple Layers of Photopolymer Film

In this example, the multiple Bragg gratings are recorded onto separate layers of photopolymer film that may be laminated on top of each other. This example describes the setup and process of making a VHOE with two Bragg gratings recorded on two layers of photopolymer film laminated on top of each other. The recording setup for this example is shown in FIG. 4.

The method includes the following steps:

Step 1. Laminate the first layer of photopolymer film onto the recording station and place the TIR coupling prism on top of the photopolymer film such that they are optically coupled together using an index-matching liquid.

Step 2. Record the first Bragg grating on first photopolymer film with two laser beams with geometry of interest $(\theta^1_1, \theta^2_1)$. The recording angles are determined by the desired performance of the grating. For this particular example, the recording angles for the first Bragg grating are $\theta^1_1=2$ degrees and $\theta^1_2=68.5$ degrees with respect to the surface normal of the recording block.

Step 3. Photo bleach the first layer of photopolymer film with first Bragg grating recording.

Step 4 Identify the recording beam geometry for the second Bragg gating by:
 a. Illuminating the first Bragg grating with one of the recording laser beam RB1 and monitoring the diffracted light. This can be done by visual inspection directly or with a camera.

b. Rotating RB1 to the shifted position of ($\theta^2{}_1$) where the diffracted beam intensity falls but still observable either visually or with a camera. This should be near the edge of the acceptance angle range of first Bragg grating where the diffraction efficiency drops to zero. For this particular example, the shift may be around 9 degrees and $\theta^1{}_2=11$ degrees with respect to the surface normal of the recording block.

c. Shifting the second recording beam (RB2) such that the interference pattern generated by RB1 and RB2 at the photopolymer plane collapse to less than one fringe. At this point, RB2 is positioned at ($\theta^2{}_2$) and the two recording beams are set up for second Bragg grating. For this particular example, the $\theta^2{}_2=52.5$ degrees with respect to the surface normal of the recording block.

Step 4. Laminate the second layer of photopolymer film on top of the first layer of photopolymer film (that contains the first Bragg grating) and record the second Bragg grating on the second layer of photopolymer film with recording geometry determined in Step 4.

Step 5. Photo bleach the second photopolymer film with second Bragg grating recording.

Step 6. The VHOE with two Bragg grating is ready. Delaminate the photopolymer films from the recording station.

Either of these two processes (Example 1 or Example 2) may be repeated for third, fourth, and additional Bragg gratings to further increase the acceptance angle range of the combined VHOE. The main limitation on the number of Bragg gratings that may be recorded using the first method (described in Example 1) is the complexity of the recording setup. As the number of lasers increase, the recording setup becomes more complex and space becomes limited. The main limitation on the number of Bragg gratings that may be layered on top of each other using the second method (described in Example 2) is absorption. Each layer of photopolymer film absorbs a small percentage of the light that propagates through it, and as the number of layers increase, the amount of light lost due to absorption increases. Note that the Bragg gratings may be printed on the film or films prior to installing the film on a waveguide substrate, or alternatively, the Bragg gratings may be printed on the film or films after installing the film on the waveguide substrate.

Example 3

Examples 1 and 2 describe methods for the setup and recording of VHOEs with two Bragg gratings for a single color. Both methods may also be applied to make VHOEs with two or more Bragg gratings for multiple colors (e.g. three colors in red, green, blue or "RGB" system). For the first method, total of six lasers will be needed for an RGB system, two for each color. The setup for the recording geometry for the other colors is the same as the initial one described above. For the second method, only three lasers are needed, one for each color, and the process simply repeats for the other two colors. Alternatively, multiple (for example three) recording stations can be setup such that each recording station is dedicated for a single color.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A volume holographic optical element (VHOE) with expanded angular range, the VHOE comprising:
   a. a first Bragg grating having a first diffraction geometry and a first Bragg condition; and
   b. a second Bragg grating having a second diffraction geometry and a second Bragg condition;
   wherein the first diffraction geometry is substantially identical to the second diffraction geometry, and wherein the second Bragg condition is shifted with respect to the first Bragg condition by an offset angle,
   wherein the first Bragg grating is configured to diffract, at a first diffraction angle, a light beam that is incident to the VHOE at an incident angle,
   wherein the second Bragg grating is configured to diffract, at a second diffraction angle, the light beam that is incident at the incident angle, and
   wherein the second diffraction angle is substantially the same as the first diffraction angle.

2. The VHOE of claim 1, wherein the offset angle is less than half of a sum of acceptance angle ranges of the first and second Bragg gratings.

3. The VHOE of claim 1, wherein both Bragg gratings are in a single film.

4. The VHOE of claim 1, wherein each of the first and second Bragg gratings is in a different film.

5. The VHOE of claim 1, wherein the first and second Bragg gratings correspond to first and second overlapping fields of view.

6. The VHOE of claim 1, wherein the VHOE additionally comprises a third Bragg grating having a third diffraction geometry and a third Bragg condition, and wherein the third diffraction geometry is substantially identical to the first and second diffraction geometries, and the third Bragg condition is shifted with respect to the second Bragg condition by another offset angle.

7. A waveguide image combiner for combining light from real imagery with light from a light engine, said waveguide image combiner comprising:
   a. an optically transparent substrate having top and bottom surfaces; and
   b. a pair of incoupling and outcoupling volume holographic optical elements (VHOEs) spaced apart and overlaid on the top surface of the optically transparent substrate;
   wherein the optically transparent substrate is configured to convey light from the incoupling VHOE to the outcoupling VHOE via total internal reflection (TIR), wherein the incoupling VHOE comprises a first Bragg grating and a second Bragg grating with substantially identical diffraction geometries and Bragg conditions shifted with respect to each other, wherein the first Bragg grating is configured to diffract, at a first diffraction angle, a light beam that is incident to the incoupling VHOE at an incident angle, wherein the second Bragg grating is configured to diffract, at a second diffraction angle, the light beam that is incident at the incident angle, and wherein the second diffraction angle is substantially the same as the first diffraction angle.

8. The waveguide image combiner of claim 7, wherein each of the VHOEs comprises multiple Bragg gratings for each of a plurality of color ranges, and wherein the Bragg gratings for each color range have substantially identical diffraction geometries and Bragg conditions shifted with respect to each other.

9. The waveguide image combiner of claim 8, wherein each of the VHOEs comprises multiple stacked films, and wherein each film comprises multiple Bragg gratings.

10. The waveguide image combiner of claim 8, wherein each of the VHOEs comprises multiple stacked films, wherein each of the multiple stacked films comprises a Bragg grating for each of the plurality of color ranges.

11. The waveguide image combiner of claim 8, wherein each of the VHOEs comprises multiple stacked films, wherein each of the multiple stacked films comprises multiple Bragg gratings for one of the plurality of color ranges.

12. An apparatus comprising:
a volume holographic optical element (VHOE) with expanded angular range, the VHOE comprising:
 a. a first Bragg grating having a first diffraction geometry and a first Bragg condition; and
 b. a second Bragg grating having a second diffraction geometry and a second Bragg condition;
 wherein the first diffraction geometry is substantially identical to the second diffraction geometry, and wherein the second Bragg condition is shifted with respect to the first Bragg condition by an offset angle,
 wherein the first Bragg grating is configured to diffract, at a first diffraction angle, a light beam that is incident to the VHOE at an incident angle,
 wherein the second Bragg grating is configured to diffract, at a second diffraction angle, the light beam that is incident at the incident angle, and
 wherein the second diffraction angle is substantially the same as the first diffraction angle; and
a waveguide combiner configured to combine first light from real imagery with second light from a light engine,
 wherein the VHOE is coupled with the waveguide combiner.

13. The apparatus of claim 12, wherein the VHOE is an incoupling VHOE overlaid on a first surface of a substrate of the waveguide combiner, and wherein the waveguide combiner further comprises an outcoupling VHOE overlaid on the first surface or a second surface of the substrate.

14. The apparatus of claim 13, wherein the outcoupling VHOE comprises a third Bragg grating and a fourth Bragg grating with substantially identical diffraction geometries and Bragg conditions shifted with respect to each other.

15. The apparatus of claim 12, wherein the VHOE comprises a plurality of films arranged in a stacked arrangement and forming at least a portion of the first Bragg grating.

16. The apparatus of claim 12, wherein the VHOE comprises a first film and a second film separate from the first film, wherein the first Bragg grating is included in the first film, and wherein the second film comprises the second Bragg grating.

17. The apparatus of claim 16, wherein a Bragg shift between the second Bragg condition and the first Bragg condition corresponds to a decrease in intensity of a diffracted beam via the second film.

18. The apparatus of claim 16, wherein the first film and the second film are arranged in a stacked arrangement.

19. The apparatus of claim 12, wherein the VHOE comprises a film that forms at least a portion of the first Bragg grating, wherein the film is associated with a first color range only.

20. The apparatus of claim 12, wherein the VHOE comprises a film that forms at least a portion of the first Bragg grating, wherein the film is associated with at least a first color range and a second color range.

* * * * *